INVENTOR.
FRANK INGENERI
BY
*Allen and Allen*
ATTORNEYS

Dec. 14, 1971          F. INGENERI          3,626,608
ELECTRONIC EDUCATIONAL AND AMUSEMENT DEVICE
Filed Dec. 5, 1969          9 Sheets-Sheet 2
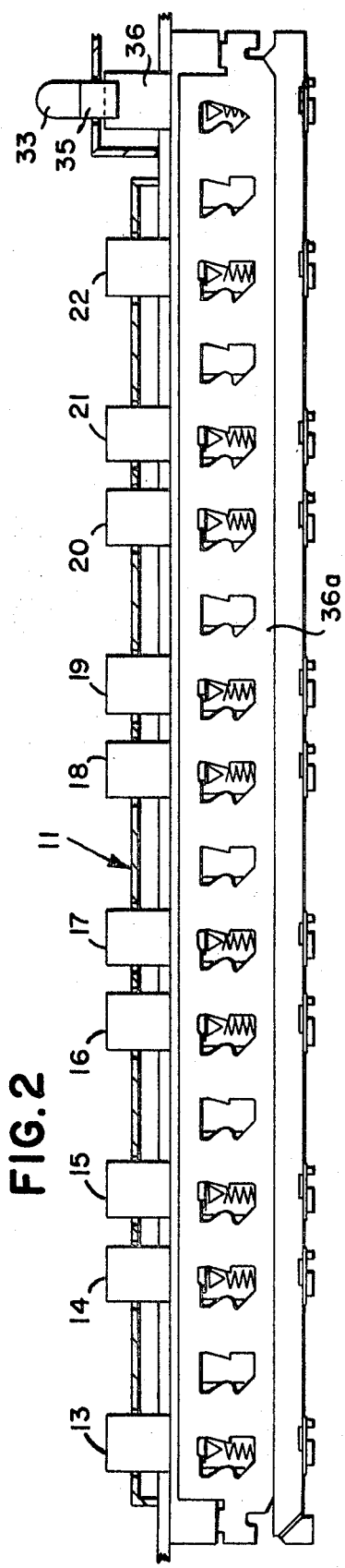
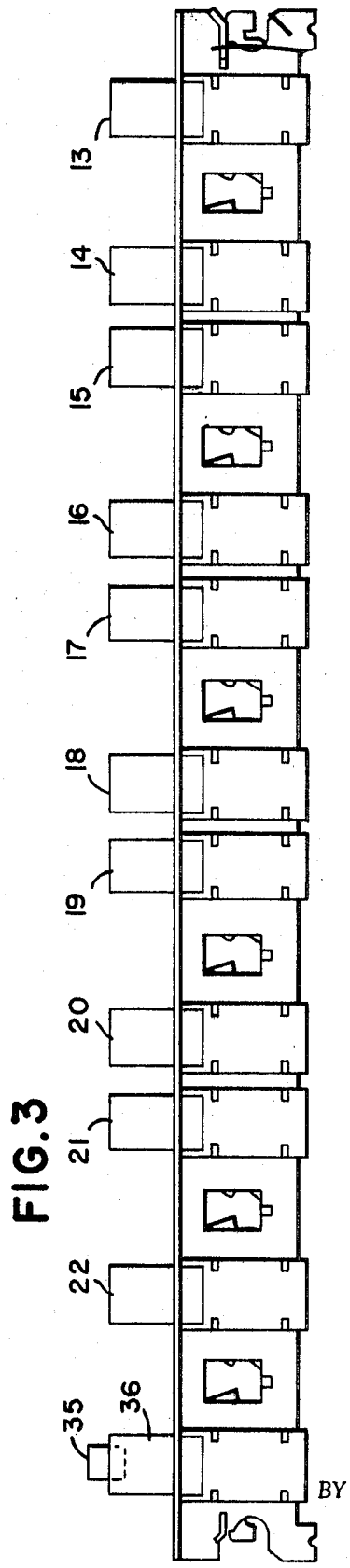
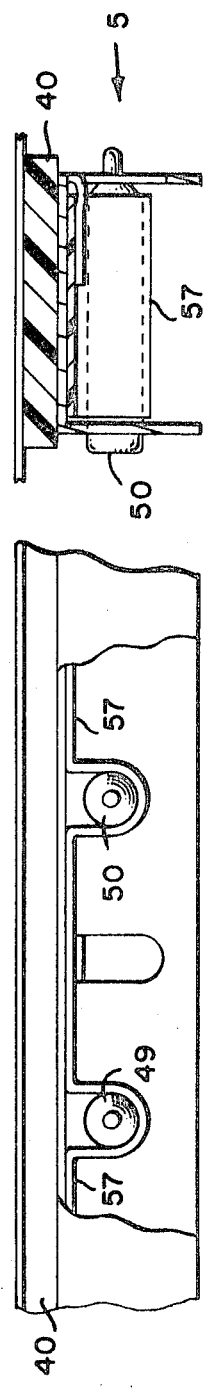
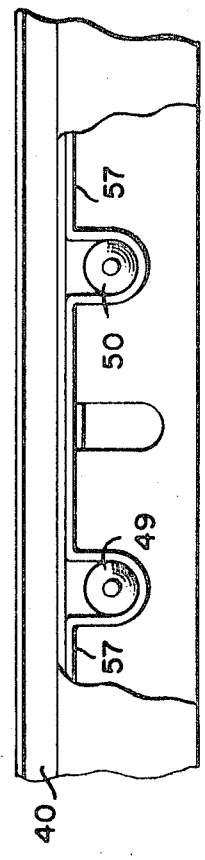
INVENTOR.
FRANK INGENERI
BY
ATTORNEYS

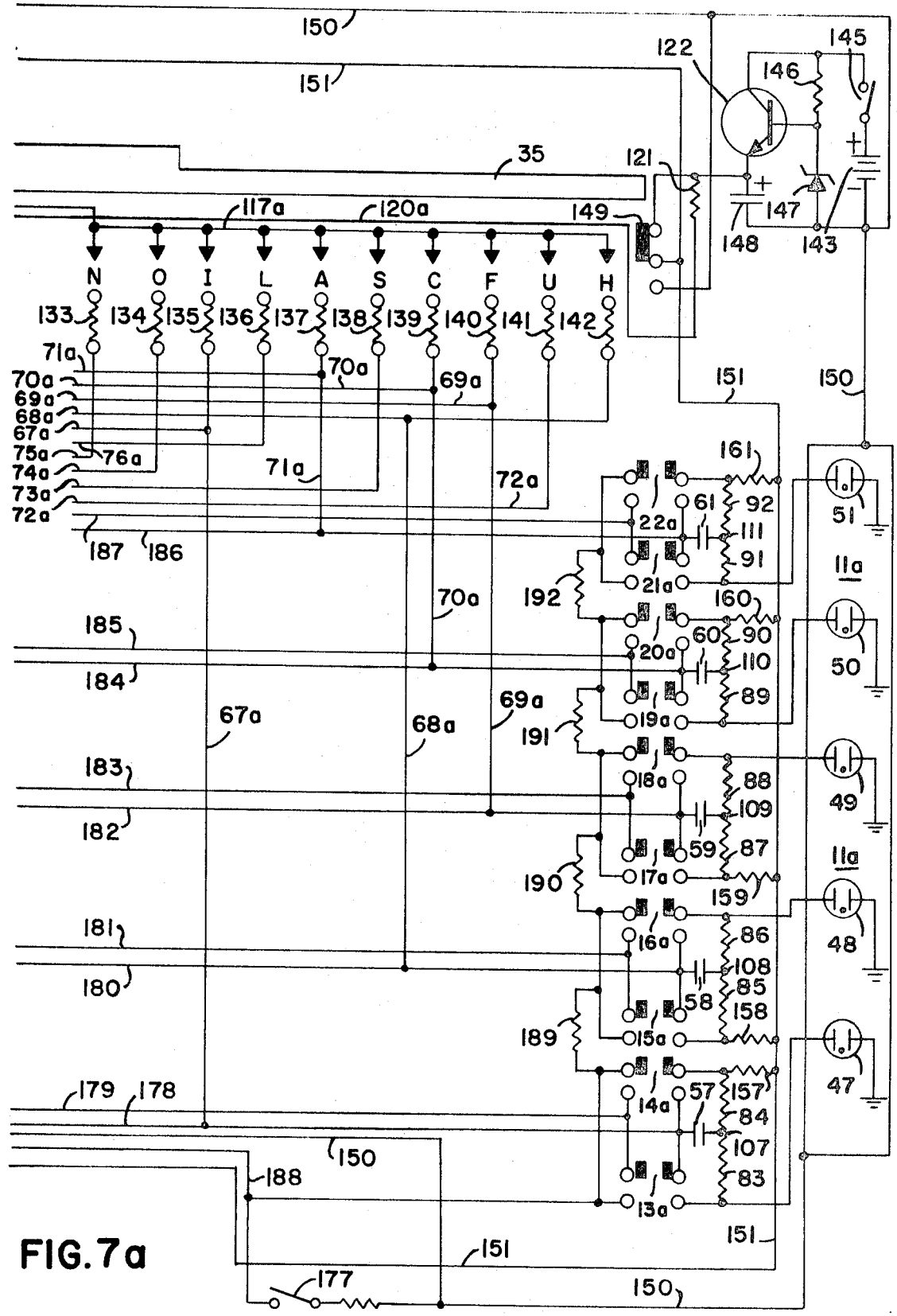

United States Patent Office 3,626,608
Patented Dec. 14, 1971

3,626,608
ELECTRONIC EDUCATIONAL AND AMUSEMENT DEVICE
Frank Ingeneri, Santa Clara, Calif., assignor to Self Development Inc., San Jose, Calif.
Continuation-in-part of application Ser. No. 629,604, Apr. 10, 1967. This application Dec. 5, 1969, Ser. No. 882,420
Int. Cl. G09b 7/06
U.S. Cl. 35—48 R
14 Claims

ABSTRACT OF THE DISCLOSURE

An electrical device which is adapted for use either as a teaching aid or an amusement device for testing a person's knowledge in various subjects. This device is provided with a question card which is also adapted to control the programming of the electrical memories provided to the device. The question card has a plurality of questions printed thereon which are adapted to be aligned with the play switches of this device when the card is placed on the panel positioned to control the programming switches. The programming switches are actuated by a programming bar. This bar closes the programming switches which are aligned with perforations provided to the question card. This device is provided with a single battery and a power circuit which is adapted to charge the various capacitors of the memory, either positively or negatively, depending upon the programming of the device. This device is also provided with a circuit whereby either questions with multiple choice two or multiple choice four answers may be employed therewith. It is also provided with a circuit for counting the number of correct answers provided to a given set of questions.

DESCRIPTION OF THE INVENTION

This application is a continuation-in-part of my application Ser. No. 629,604, filed Apr. 10, 1967, now Pat. No. 3,540,138, issued Nov. 17, 1970.

This invention relates to an electrical apparatus which may be used to test a person's knowledge of various subjects either for educational or amusement purposes.

An object of this invention is to provide an improved teaching aid or amusement device which is both economical to manufacture and to use.

Another object of this invention is to provide an improved teaching aid or amusement device which is adapted to be used to test a person's knowledge of various subjects and which may be operated for long periods of time from a conventional and relatively inexpensive battery.

Another object of this invention is to provide an improved teaching aid and amusement device which is adapted to be used to test a person's knowledge of various subjects and which may be used in connection with questions having either multiple choice 2 or multiple choice 4 answers.

Still another object of this invention is to provide an improved electrical device which is adapted to be used to test a person's knowledge of various subjects. The questions relating to the selected subject are provided on a card which is adapted to be aligned with electrical switches provided to this device. The card also is provided with means to control the programming of the device, said programming including the providing of either positive or negative charges to various storage devices included in the memory of the device and said storage devices being adapted to be discharged by switches correlated with the questions on the card and the selection of the correct answers to the various questions is indicated and the number of correct answers recorded.

Other and further objects of this invention will be apparent to those skilled in the art to which it relates from the following specification, claims and drawing.

In accordance with this invention, there is provided an electrical teaching aid and amusement device which is an improvement over the device shown in my Pat. No. 3,327,405, issued June 27, 1967. This improved device provides, among other things, for more economical utilization of the electrical current supply which is in the form of a battery. A single source of current supply is employed in the present invention and through the use of an improved circuit, the capacitors employed in the memory of this device may be charged either positively or negatively, depending upon the programming of the device.

This invention also provides for an improved arrangement in which question cards having either multiple choice two or multiple choice four answers are employed.

An economical arrangement is also provided whereby the number of correct answers a student made on a particular question card may be recorded, thereby providing automatic scoring of a student's answers for the various question cards.

Further details of this invention will be set forth in the following specification, claims and drawing in which, briefly:

FIG. 2 is a side view of one of the banks of pushbutton switches taken along the line 2—2 of FIG. 1;

FIG. 3 is a view taken along the line 3—3 of FIG. 1 showing the other side of this bank of pushbutton switches;

FIG. 4 is a sectional view taken along the line 4—4 of FIG. 1;

FIG. 5 is a fragmentary view of two of the indicating lamps employed in this device showing the mounting thereof;

FIGS. 7 and 7a are similar to FIGS. 6 and 6a and show a wiring diagram of another embodiment of this invention;

Figure 6:
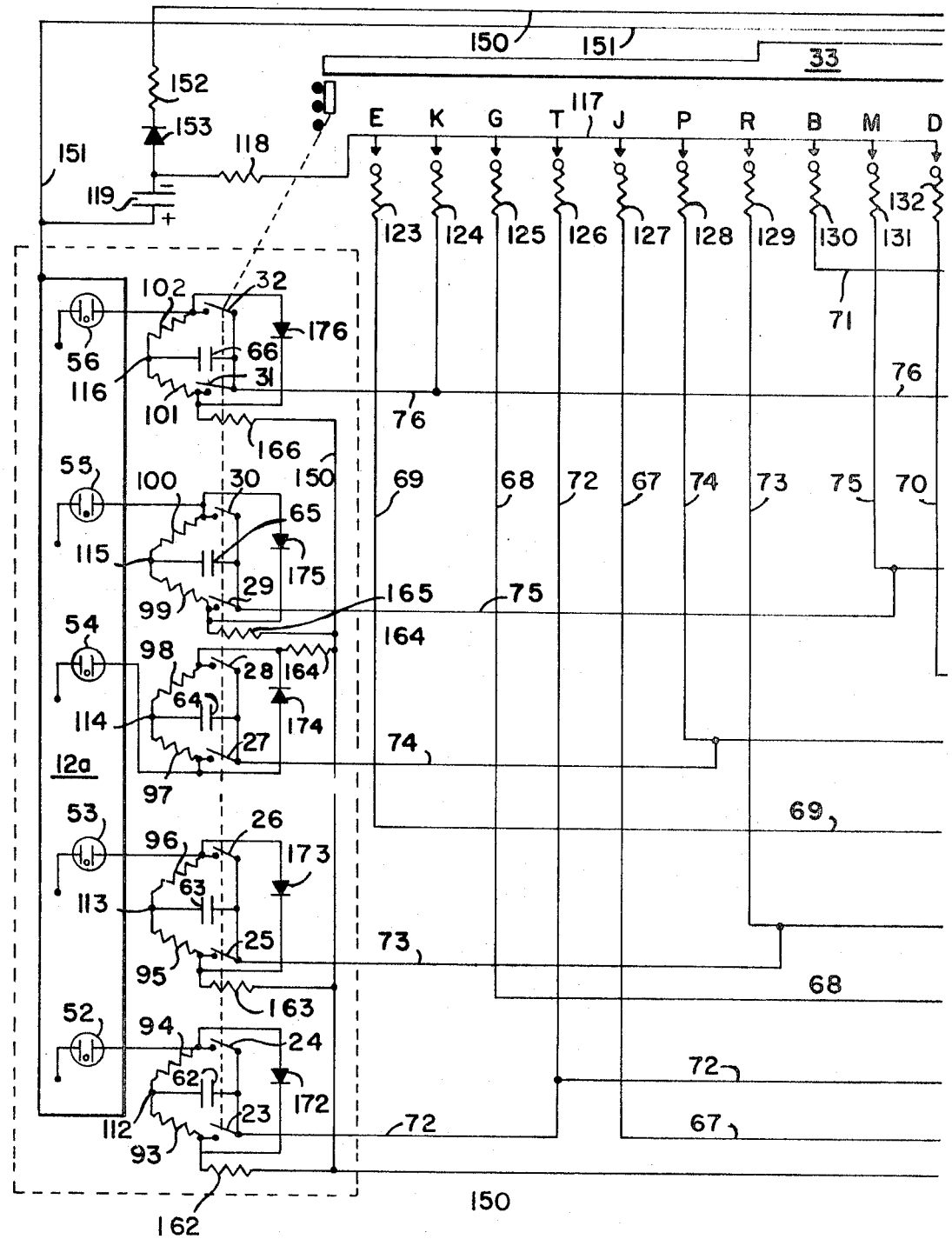
FIGS. 6 and 6a show a schematic wiring diagram of an embodiment of this invention and in this case the right hand side of FIG. 6 is aligned with the left hand side of FIG. 6a to show the complete diagram.
Figure 6A:
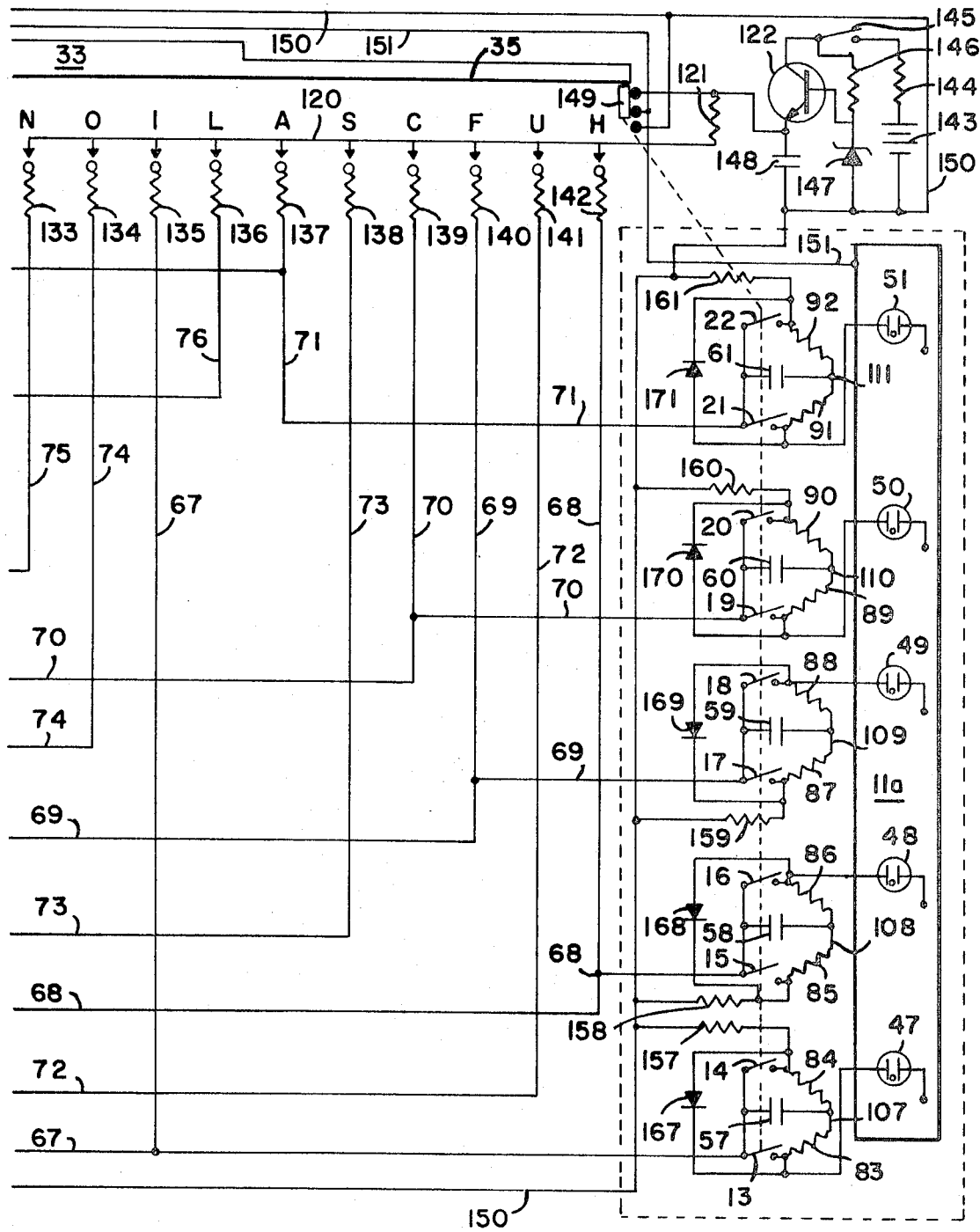
Figure 7:
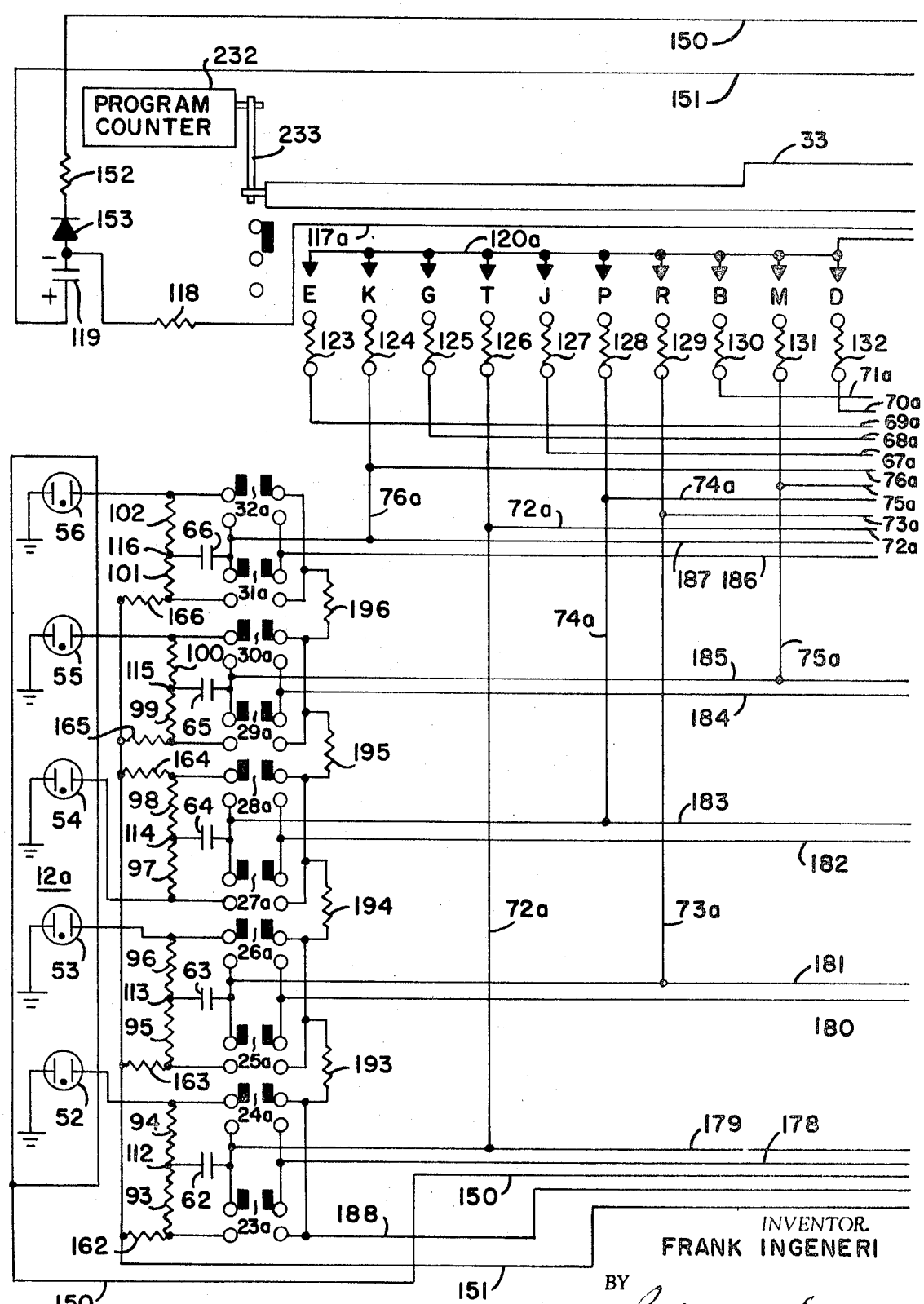
Figure 8:
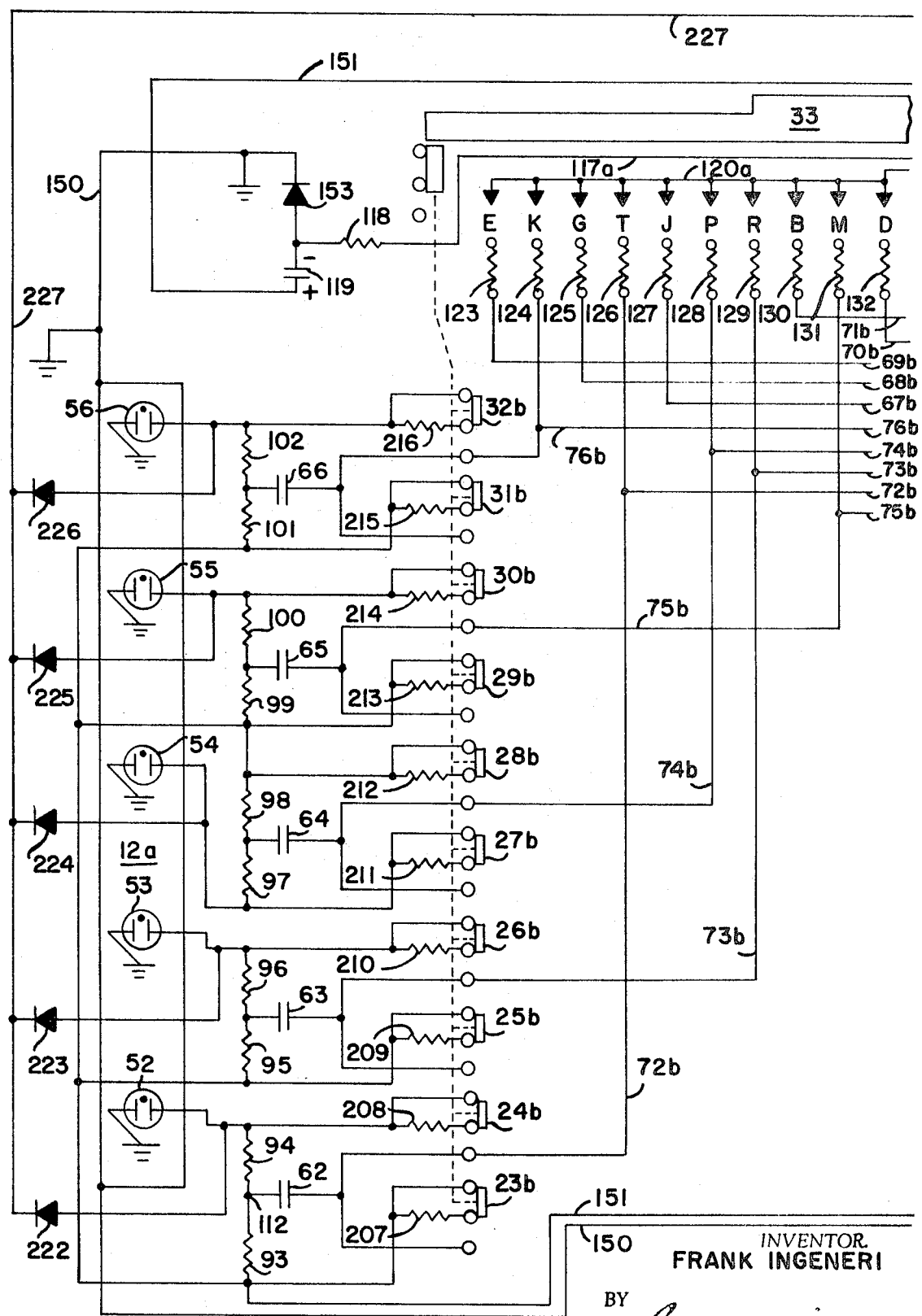
Figure 8A:
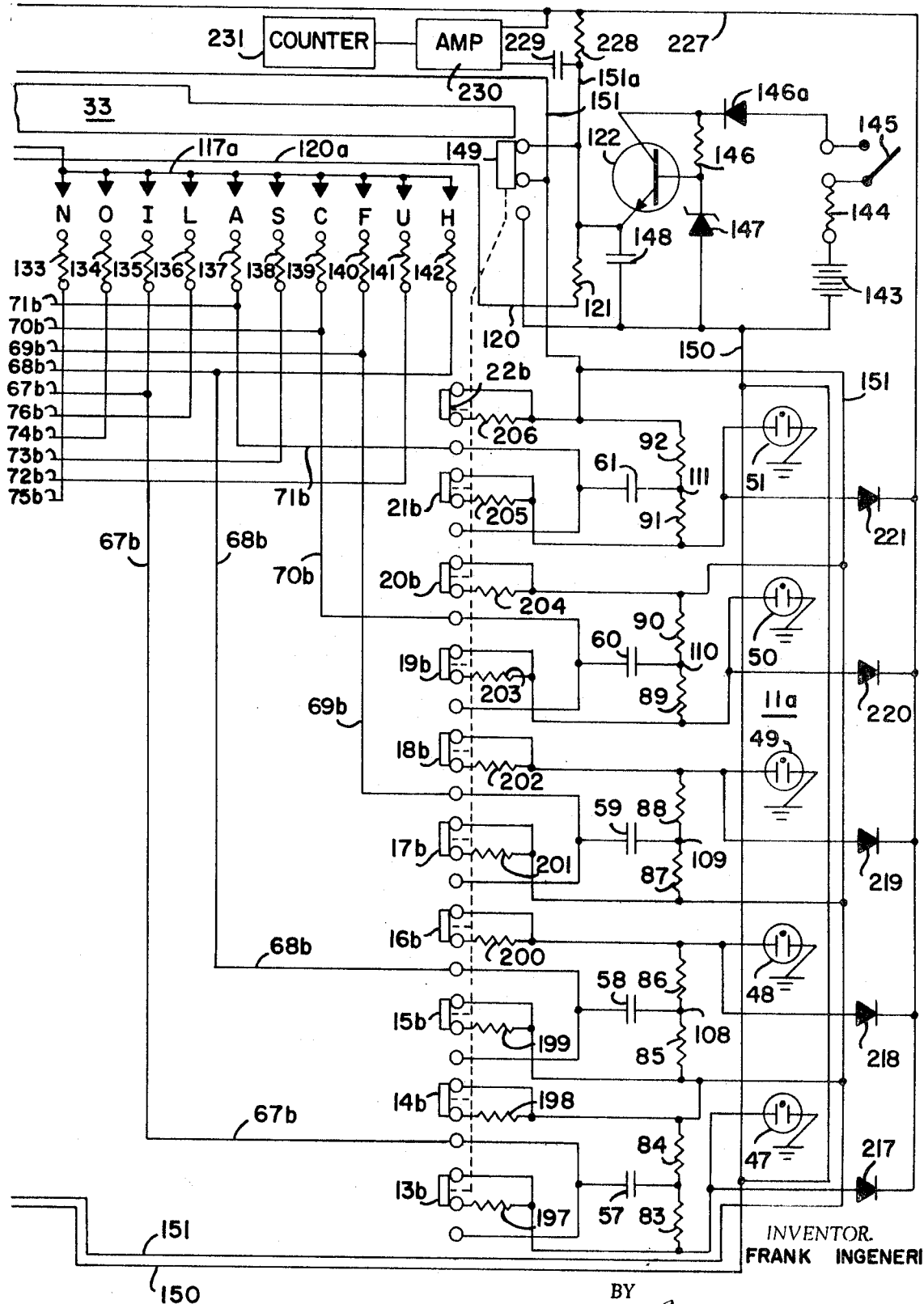
Figure 9:
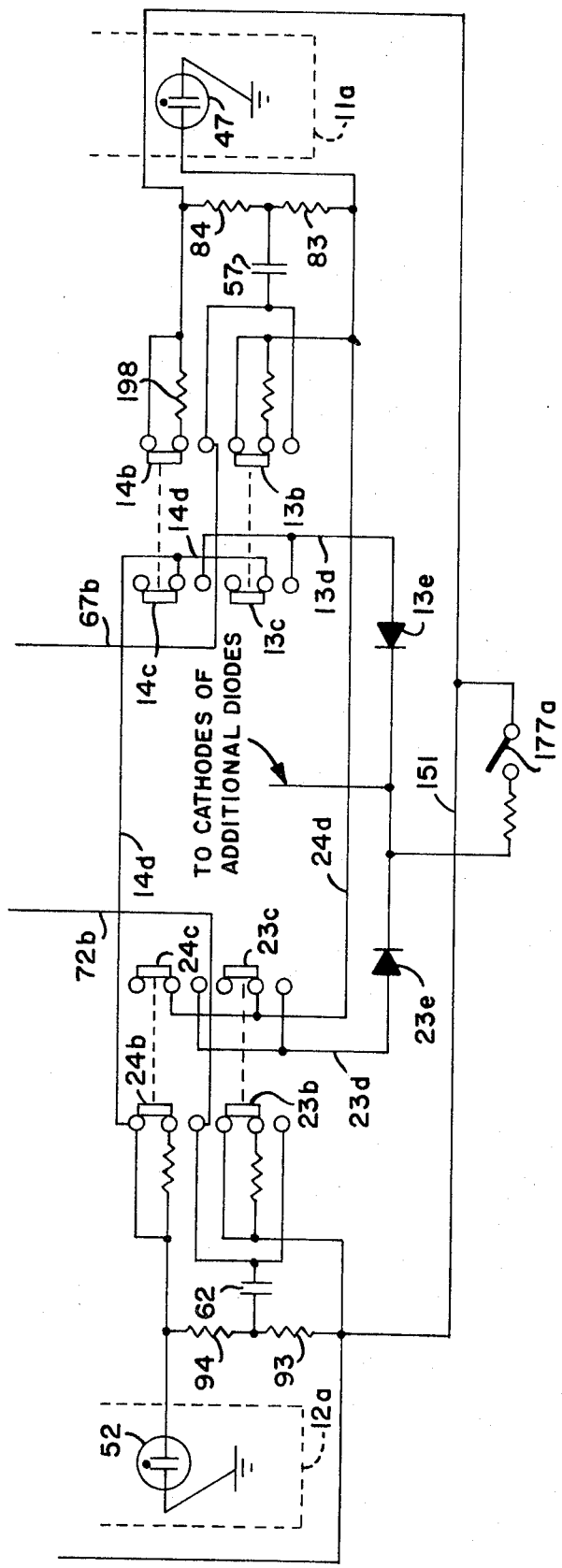

FIGS. 8 and 8a are similar to FIGS. 6 and 6a and FIGS. 7 and 7a and show a wiring diagram of another embodiment of this invention which is provided with circuits for recording the correct answers provided by a person using this invention with a particular set of questions given on cards provided for this device; and FIG. 9 is a diagram illustrating additions to the circuit shown in FIGS. 8 and 8a to provide either a choice 2 or a choice 4 device.

Referring to the drawing in detail, reference numeral 10 designates the cabinet or housing of this device which may be made of plastic, wood, metal or the like. This device is provided with two switch panels 11 and 12 which are positioned on the right hand and left hand sides of the top of the cabinet, respectively, so that these switches are on the opposite sides of a question card such as the card 10a which is adapted to be laid on the top of the cabinet 10.

Panel 11 is provided with a switch bank including switches 13 to 22, inclusive, which may be of the pushbutton or similar type and opposite side views of which are illustrated in FIGS. 2 and 3. Panel 12 is similar to panel 11 and is provided with a switch bank including switches 23 to 32, inclusive, which are constructed the same as switches 13 to 22, inclusive. These switches are made by Switch Craft Inc., of Chicago, Ill., and the right hand switch bank is designated by the type XA-30080 DW and left hand switch 12 is designated by type XA-30079 DW. Other types of switches may, of course, be employed in this apparatus and these specific types are given here only by way of example.

A program bar 33 is supported in the upper portion of the cabinet 10 and the central part of this program bar is accessible through a suitable slot provided in the panel 34. Program bar 33 is provided with extensions such as the extension 35 shown in the drawing on the right hand side and a similar extension which is not shown is provided on the left hand side. The extension 35 is adapted to depress the switch unlatching button 36 which when depressed functions to move the switch latching bar 36a forward to unlatch any of the switches 13 to 22, inclusive, which may have been depressed during the operation of this device so that these switches which are spring-loaded return to their normal positions. A similar pushbutton is associated with the latching bar of switches 23 to 32, inclusive, for the same purpose so that both sets of switches are adapted to be unlatched and released to return to their normal position when the program bar 33 is depressed. The switches 13 to 32, inclusive, are adapted to be connected in accordance with the circuit diagrams shown in FIGS. 6–6a, 7–7a or 8–8a.

Figure 1:
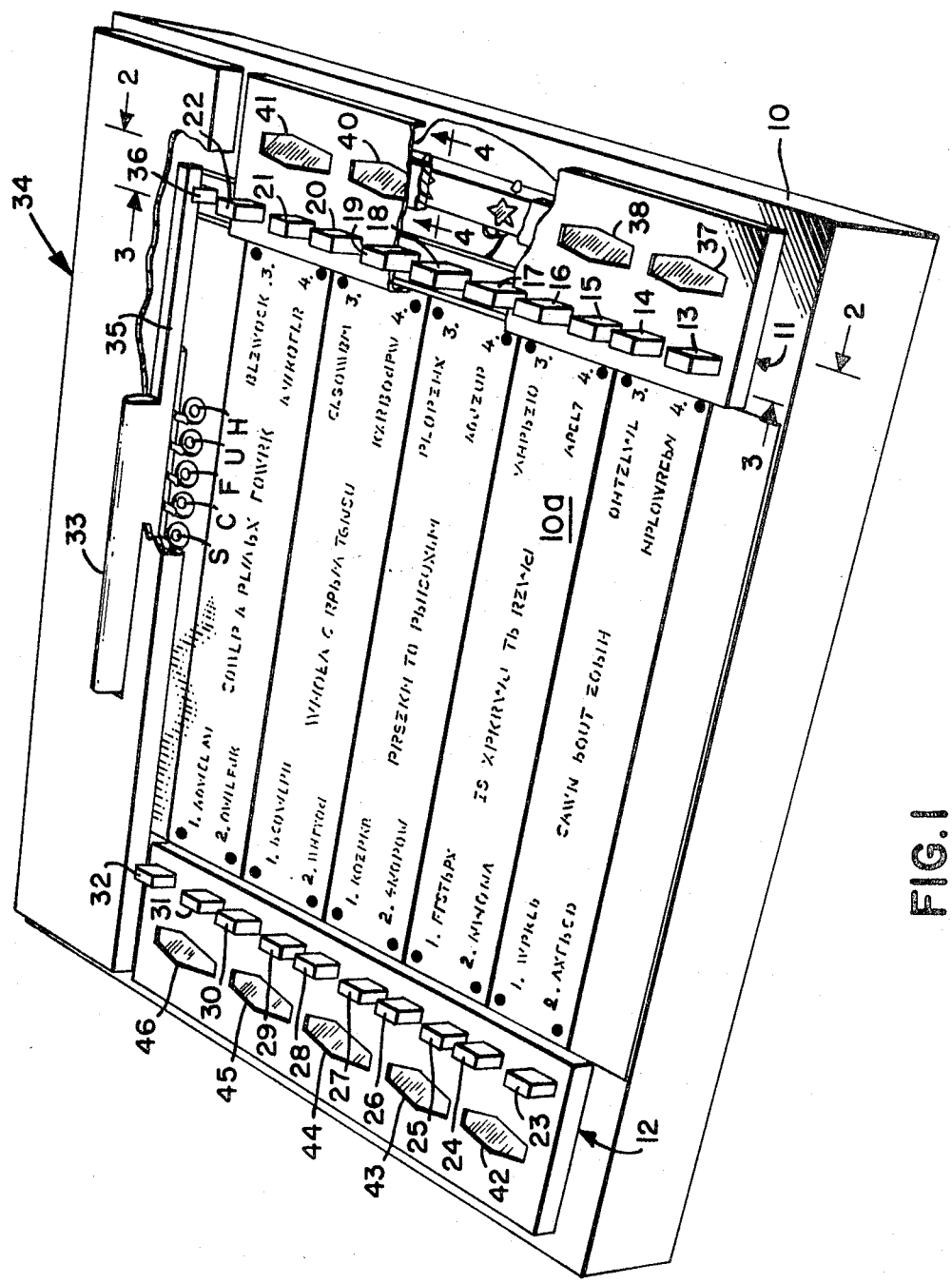
FIG. 1 is a perspective view partially broken away of an embodiment of this invention.

The switch panels 11 and 12 are also provided with suitable windows for viewing small lamps such as gas discharge type lamps provided with an atmosphere of neon or similar gas which is caused to glow when the lamp is fired. Switch panel 11 which is shown partially broken away in FIG. 1 is provided with windows 37, 38, 40 and 41 and a fifth window which would normally be positioned between windows 38 and 40 is not shown. Switch panel 12 is provided with five windows 42 to 46, inclusive. The gas discharge lamps 47 to 56, inclusive, which are connected as shown in the wiring diagrams are positioned under these respective windows. These lamps are supported under the panels 11 and 12 by suitable straps made of insulation such as the strap 57 shown in FIGS. 4 and 5 in which a section of this strap is illustrated supporting the tubular lamps 49 and 50. These lamp supporting straps are shaped to have small lamp receiving cradles in spaced positions so that a lamp is supported between adjacent pairs of the switches. These insulation straps hold the lamps under metal plates 11a and 12a to which one side of each lamp is connected as shown in FIGS. 6–6a, 7–7a and 8–8a, so that these metal plates are included in the lamp circuits. The lamps are positioned with respect to the switches as follows: Lamp 47 is supported between switches 13 and 14; lamp 48 is supported between switches 15 and 16; lamp 49 is supported between switches 17 and 18 and so on in the cases of lamps 50, 51, 52, 53, 54, 55 and 56 so that lamp 56 is supported between switches 31 and 32. The purpose of this arrangement will be further described in connection with the description of the operation of this device.

In referring to the wiring diagrams FIGS. 6–6a it will be noted that the movable blades of switches 13–14, 15–16, 17–18, 19–20, 21–22, 23–24, 25–26, 27–28, and 29–30, and 31–32 are connected together in pairs to one side of the capacitors 57 to 66, inclusive, respectively, and to lines 67 to 76, inclusive, respectively. Lines 67 to 76, inclusive, lead to contacts associated with the program bar 33. Pairs of resistors 83–84, 85–86, 87–88, 89–90, 91–92, 93–94, 95–96, 97–98, 99–100 and 101–102 are connected in series between the stationary or fixed contacts of switch pairs 13–14, 15–16, 17–18, 19–20, 21–22, 23–24, 25–26, 27–28, 29–30, and 31–32, respectively. These resistance pairs are provided with common connections 107 to 116, inclusive, which are connected to the other sides of capacitors 57 to 66, inclusive, respectively.

This device is provided with 20 electrical switches which are adapted to be actuated by the program bar 33 and which are designated by the letters of the alphabet A to U as shown in FIGS. 6 and 6a of the drawing. These electrical switches include spring members which are adapted to be pressed down when the program bar is depressed and which are adapted to make contact with the fixed contacts supported by the top panel of the cabinet 10. The panel is adapted to support the question card 10a so that the questions printed on this card and answers associated therewith are positioned on the sides of the various switches 13 to 32. The top of this card is provided with perforations aligned with the switches which are designated by the letters of the alphabet and the switches aligned with the perforations on the card determine the program to be placed in the memories of this device when the program bar 33 is depressed. This will be described more fully hereinafter in the discussion of the operation of this device.

The movable contacts of the programming switches E, K, G, T, J, P, R, B, M, and D, shown in FIG. 6, are connected together to line 117 and through resistor 118 to the upper terminal of capacitor 119, which is designated as the negative terminal thereof. The movable contacts of programming switches N, O, I, L, A, S, C, F, U, and H shown in FIG. 6a, are connected together to the line 120 and through resistor 121 to the emitter of the voltage regulating transistor 122.

The fixed contacts of the programming switches E, K, G, T, J, P, R, B, M and D are connected to the upper terminals of current limiting resistors 123, 124, 125, 126, 127, 128, 129, 130, 131 and 132, respectively, as shown in FIG. 6 and the fixed terminals of programming switches N, O, I, L, A, S, C, F, U and H are connected to the upper terminals of current limiting resistors 133, 134, 135, 136, 137, 138, 139, 140, 141 and 142, respectively, as shown in FIG. 6a.

Line 67, which is connected to capacitor 57 is also connected to the bottom terminals of resistors 127 and 135; line 68, which is connected to capacitor 58 is also connected to the bottom terminals of resistors 125 and 142; line 69, which is connected to capacitor 59, is also connected to the bottom terminals of resistors 123 and 140; line 70, which is connected to capacitor 60, is also connected to the bottom terminals of resistors 132 and 139. Line 71, which is connected to the capacitor 61, is also connected to the bottom terminals of resistors 130 and 137; line 72, which is connected to capacitor 62, is also connected to the bottom terminals of resistors 126 and 141; line 73, which is connected to capacitor 63, is also connected to the bottom terminals of resistors 129 and 138; line 74, which is connected to capacitor 64, is also connected to the bottom terminals of resistors 128 and 134; line 75, which is connected to capacitor 65, is also connected to the bottom terminals of resistors 131 and 133 and line 76, which is connected to capacitor 66, is also connected to the bottom terminals of resistors 124 and 136. Lines 67a to 76a shown in FIGS. 7, 7a and lines 67b to 76b shown in FIGS. 8, 8a are connected to resistors 123 to 142 in the same way as are lines 67 to 76 described above.

This network of connections enables the user of this device to control the polarity of the electric charges applied to capacitors 57 to 66 inclusive, in accordance with the programming perforations provided to the question card 10a. These capacitors receive negative charges if the programming switches connected to the negative line 117 are activated by the program to provide such charges, that is, if the question card is provided with perforations aligned with these switches. On the other hand when selected switches connected to the positive line 120, are aligned with perforations on the question card then positive charges are supplied to the capacitors connected thereto. Thus, the lines 67 to 76 may provide either positive or negative charges to the capacitors 57 to 66, respectively, and the positive or negative polarity supplied to the respective capacitors depends upon whether the line connected to the respective capacitor is connected to the positive line 120 through the right hand group of programming switches shown in FIG. 6a or to the negative line 117 connected to the left hand group of programming switches shown in FIG. 6.

The charging current for the capacitors 57 to 66 inclusive, is provided by the battery 143 or other suitable direct current supply. The negative terminal of the battery is connected to the negative line 150. The positive terminal is connected to the bottom terminal of current limiting resistor 144 and the upper terminal of this resistor is connected to switch 145 which may be a micro-type switch that is adapted to be actuated by the question card 10a when it is placed on the top panel of the cabinet 10 with its upper end inserted under panel 34. For this purpose this switch is located under the panel 34 which is attached to the upper part of the cabinet, as shown in FIG. 1. Switch 145 is connected to the collector of transistor 122 and the upper terminal of resistor 146. Resistor 146 is connected between the collector and base of transistor 122 and the cathode of Zener diode 147 is connected to the base of the voltage regulating transistor 122. The anode of Zener diode 147 is connected to the negative line 150 and capacitor 148 is connected between the emitter of transistor 122 and the negative line 150. The negative line 150 is connected to the upper terminal of resistor 152 shown at the top of FIG. 6 and the lower terminal of this resistor is connected to the cathode of diode 153. The anode of this diode is connected to the upper terminal of capacitor 119 which is also connected to the negative line 117 through resistor 118 to provide the negative polarity for charging the capacitors in the programming thereof as previously described.

A ground line 151 is provided between the right hand light bank including the neon lights 47 to 51 inclusive, and the left hand light bank including the neon lights 52 to 56 inclusive. This ground line 151 is also connected to the bottom side of the capacitor 119 as shown in FIG. 6 and it is normally connected to the emitter of transistor 122 through switch 149 as shown in FIG. 6a so that capacitor 119 is charged as with the bottom side positive and the top side which is connected to programming line 117, is negative. Programming line 120 is positive since it is connected to the positive side of current source 143 through transistor 122. It will be noted that one side of the neon lights 47 to 51 inclusive, is connected to the ground plate 11a shown in FIG. 6a and likewise one side of neon lamps 52 to 56 inclusive, shown in FIG. 6 is connected to the ground plate 12a. Neon lamps 47, 48, 49, 50 and 51 have the other sides thereof connected to one end of the resistor pairs 83–84, 85–86, 87–88, 89–90, and 91–92, respectively, and the other ends of these resistor pairs are connected through resistors 157 to 161, respectively, to the negative line 150.

Thus, the neon lamps 47, 50, 51 and 54 are connected to the lower ends of resistors 83, 89, 91 and 97, respectively, and current limiting resistors 157, 160, 161 and 164 are connected between the negative line 150 and the upper ends of resistors 84, 90, 92 and 98, respectively. The neon lamps 48, 49, 52, 53, 55 and 56 are on the other hand connected to the upper terminals of resistors 86, 88, 94, 96, 100 and 102, respectively, and current limiting resistors 158, 159, 162, 163, 165 and 166 are connected between the negative line 150 and the lower terminals of resistors 85, 87, 93, 95, 99 and 101, respectively. Thus, it will be noted that normally the neon lamps 47 to 56 inclusive are connected in series with relatively high resistance so that these lamps will not fire unless the capacitors associated therewith are discharged in the proper direction through the respective resistor networks as will be described hereinafter.

The resistors 83 to 102, inclusive, which are associated with the capacitors 57 to 66, inclusive, are of relatively high value and in order to reduce the voltage drops across these various resistance networks after the neon lamps associated therewith are fired suitable diodes 167 to 176, inclusive, are shunted across these respective resistance networks. These diodes are connected with the polarities thereof in the proper direction so that once the lamps associated therewith are fired the major part of the current flowing through the individual lamps then also flows through the diode associated therewith, so that the firing of the lamps is sustained thereafter by the current passing through the respective diodes.

In FIGS. 7 and 7a there is illustrated a wiring diagram which is similar to that shown in FIGS. 6 and 6a and the parts of FIGS. 7 and 7a corresponding to those shown in FIGS. 6 and 6a will be designated by the same reference numerals. One of the main differences between the circuit shown in FIGS. 7 and 7a and the circuit shown in FIGS. 6 and 6a is that the non-latching type switches 13a to 32a which correspond to the switches 13 to 32, respectively, of FIGS. 6 and 6a are each provided with two movable contacts that are insulated from each other and this permits interconnecting of these switches in such a way that this device may be used in connection with questions each having a choice of four different answers.

The switches 13a to 22a, shown in FIG. 7a, are provided with a right-hand row of fixed contacts which are adapted to cooperate with a right-hand row of movable contacts. These switches are also provided with a left-hand row of fixed contacts which are adapted to cooperate with a left-hand row of movable contacts. The fixed contacts of these switches are connected to the resistor-capacitor circuit shown in FIG. 7a, as will now be described. This circuit includes resistor pairs 83–84, 85–86, 87–88, 89–90, 91–92 which are provided with central terminals 107 to 111, inclusive, respectively, connected to the right-hand sides of the capacitors 57 to 61, inclusive, respectively. These switches are arranged in pairs 13a–14a, 15a–16a, 17a–18a, 19a–20a, 21a–22a, and the selected fixed contacts of the right-hand row thereof are connected to the end terminals of resistor pairs 83–84, 85–86, 87–88, 89–90, and 91–92, respectively. Intermediate fixed contacts of this right-hand row of switch pairs 13a–14a, 15a–16a, 17a–18a, 19a–20a, and 21a–22a are connected to the other sides of capacitors 57, 58, 59, 60 and 61 respectively, and to the lines 178, 180, 182, 184 and 186, respectively. Switch pairs 13a–14a, 15a–16a, 17a–18a, 19a–20a, and 21a–22a are provided with a left-hand row of fixed contacts which are adapted to cooperate with a left-hand row of movable contacts as shown in FIG. 7a. The end fixed contacts of the left-hand row are interconnected by a series of resistors 189, 190, 191 and 192 and the lower terminal of the series is connected to line 188. The intermediate fixed contacts of the left-hand row are connected to lines 179, 181, 183, 185 and 187 leading to corresponding points of the switch arrangement shown in FIG. 7. Thus, lines 179, 181, 183, 185 and 187 are connected to intermediate contacts of the left-hand row of switch pairs 13a–14a, 15a–16a, 17a–18a, 19a–20a, and 21a–22a, respectively.

Switches 23a to 32a, shown in FIG. 7, are arranged into a column which may be considered as a mirror image of the switch column shown in FIG. 7a. Thus, switches 23a to 32a, inclusive, are provided with a left-hand row or fixed contacts and a right-hand row of fixed contacts which cooperate, respectively, with a left-hand column of movable contacts and a right-hand column of movable contacts. These switches are arranged in pairs 23a–24a, 25a–26a, 27a–28a, 29a–30a and 31a–32a with the end fixed contacts of the left-hand row connected to end terminals of resistor pairs 93a–94, 95–96, 97–98, 99–100, 101–102, respectively. The left hand sides of the capacitors 62, 63, 64, 65 and 66 are connected to the common terminals 112, 113, 114, 115, 116, respectively, of resistor pairs 93–94, 95–96, 97–98, 99–100 and 101–102, respectively. The intermediate fixed contacts of the left-hand row of contacts of switch pairs 23a–24a, 25a–26a, 27a–28a, 29a–30a and 31a–32a are connected to the right-hand sides of capacitors 62, 63, 64, 65 and 66, respectively, and to the lines 179, 181, 183, 185 and 187, respectively. The outer fixed contacts of the left-hand row of contacts of switch pairs 23a–24a, 25a–26a, 27a–28a, 29a–30a, and 31a–32a are connected to the end terminals of resistor pairs 93–94, 95–96, 97–98, 99–100 and 101–102, respectively. The intermediate fixed contacts of the right-hand row of contacts of switch pairs 23a–24a, 25a–26a, 27a–28a, 29a–30a and 31a–32a are connected to lines 178, 180, 182, 184 and 186, respectively, which lead to corresponding groups of contacts of the switch column shown in FIG. 7a, as previously described. The other groups of right-hand row of fixed contacts of these switch pairs are interconnected by resistors 193, 194, 195 and 196 which are connected in series between these groups and the bottom terminal of this series is connected to the line 188, which leads to the bottom terminal of the series connected resistors 189, 190, 191 and 192 and to the left-hand terminal of switch 177, as shown in FIG. 7a. Switch 177 is provided for connected line 188 to line 150 so that when this switch is closed, this device may be used in connection with questions with multiple choice four answers. When it is desired to use this device in connection with multiple choice four questions the switch 177 may be closed by inserting a multiple choice four answer card 10a on the top panel of the device. For this purpose, the switch 177 may be of the microtype located in the top part of the device under the panel member 34. This type of question card is shaped so that the top part thereof closes switch 177 when the card is inserted under the programming switches. Switch 177, when it is closed, connects the line 150 to line 188. The portion of line 188 shown in FIG. 7a is connected with the series of resistors 189, 190, 191 and 192, and the portion of line 188 shown in FIG. 7 is connected with resistors 193, 194, 195 and 196 as previously described and the purpose thereof will be described hereinafter.

Resistors 123 to 142 which are connected to the programming switches are connected in the same manner as shown in FIGS. 6 and 6a and these resistors are connected to lines 178 to 187 and to the switches 13a to 32a by lines 67a to 76a as follows:

Resistors 127 and 135 are connected by line 67a to line 178; resistors 125 and 142 are connected by line 68a to line 180; resistors 123 and 140 are connected by line 69a to line 182; resistors 132 and 139 are connected by line 70a to line 184; resistors 130 and 137 are connected by line 71a to line 186; resistors 126 and 141 are connected by line 72a to line 179; resistors 129 and 138 are connected by line 73a to line 181; resistors 128 and 134 are connected by line 74a to line 183; resistors 131 and 133 are connected by line 75a to line 185 and resistors 134 and 136 are connected by line 76a to line 187.

A modified circuit employed in accordance with this invention is shown in FIGS. 8 and 8a, and the components of this circuit which correspond to the components shown in FIGS. 6, 6a, 7 and 7a are designated by the same reference numerals. Switches 13b to 32b, inclusive, are of the latching type in that they are latched in their depressed position whereas switches 13a to 32a shown in FIGS. 7 and 7a are of the non-latching momentary contact type and they are closed only while pressure is applied thereto. In the cases of switches 13–32 of FIGS. 6 and 6a and switches 13b–32b of FIGS. 8 and 8a there is provided mechanical linkage of the type shown in FIG. 2 so that these switches are unlatched when the program bar 33 is depressed and any switch that was latched is unlatched and returned by spring pressure to its normal position. Current limiting resistors 197 to 216 are connected across the normally closed contacts of switches 13b to 32b, respectively. These switches are arranged in pairs 13b–14b, 15b–16b, 17b–18b, 19b–20b, 21b–22b, 23b–24b, 25b–26b, 27b–28b, 29b–30b and 31b–32b, which pairs are connected to the neon lamps 47, 48, 49, 50, 51, 52, 53, 54, 55 and 56, respectively. Each of these switch pairs have two normally open contacts which are connected together and which are connected to one side of the capacitors 57, 58, 59, 60, 61, 62, 63, 64, 65 and 66, respectively, and to lines 67b, 68b, 69b, 70b, 71b, 72b, 73b, 74b, 75b, and 76b, respectively. These lines are connected to the programming switches the same as lines 67 to 76, respectively, shown in FIGS. 6 and 6a.

The current limiting resistors 197 to 216 prevent excessive battery drain if both switches of a pair of switches are depressed at the same time. Thus, if both switches 13b and 14b are depressed simultaneously then current limiting resistors 197 and 198 are actively connected in series with the light source 47 and the full battery power cannot be applied to this lamp.

The circuit shown in FIGS. 8 and 8a is provided with diodes 217 to 226, inclusive, and the anodes of these diodes are connected to one side of each of the lamps 47 to 56, respectively. The cathodes of these diodes are connected together to line 227 which is connected to ore side of the input of amplifier 230. The other side of the input of this amplifier is coupled by capacitor 229 to 151a. Line 151a is connected to the positive line 151 by a switch 149 which is normally closed when the programming bar 33 is in its normally retracted position. A resistor 228 is connected between line 151a and line 227. The output of amplifier 230 is connected to the input of the counter 231 which is electromagnetically actuated and is of conventional construction.

Each time one of the lamps 47 to 56 is energized a pulse is supplied to the input of amplifier 230 through the corresponding diode 217 to 226 which is connected to the energized lamp. If the person operating this device closed the correct switches of the switch array 13b to 32b so that all of the lamps 47 to 56 were fired then the amplifier 230 would receive ten pulses through diodes 217 to 226 and counter 231 would record ten pulses indicating that all ten questions were answered correctly.

A counting arrangement such as shown connected to the circuits of FIGS. 8 and 8a may also be provided to the circuits shown in FIGS. 6, 6a and 7, 7a, by connecting an array of diodes such as diodes 217 to 226 to the lamps 47 to 56 shown in these figures.

In addition to a counter for recording the number of correct answers an additional counter 232 shown in FIG. 7 may be provided to this apparatus for recording the number of times that the program bar 33 is depressed. Counter 232 is of the mechanical type of conventional construction and it is mechanically connected by the member 233 to the program bar 33. Thus, the counter 232 is advanced one step each time the program bar 33 is depressed.

The operation of this apparatus is as follows:

This device is turned on by placing the question card 10a on the top panel of the cabinet 10 as shown in FIG. 1. The top part of the card is inserted under the escutcheon 34 attached to the cabinet structure so that the programming perforations thereof are under the programming switches. The portion of the card 10a which is inserted under the escutcheon 34 also closes the switch 145, shown in FIG. 6a. Closing this switch connects transistor 122 and Zener diode 147 to the source of current supply 143. Program bar 33 is then dperessed momentarily to close selected programming switches A to U which are aligned with the programming apertures in the top of the card 10a.

When switch 145 was closed capacitor 119 shown in FIG. 6 was charged with the polarities indicated over line 151, switch 149 and transistor 122 from the source of current supply 143. The negative side of capacitor 119 is connected to the anode of diode 153, resistor 152, line 150 to the negative terminal of current supply source 143. Diode 153 is provided to prevent capacitor 119 from being discharged when line 151 is connected to ground at switch 149. When the program bar 33 is depressed switch 149 is moved downward and connects its lower and central contacts. Line 151 is connected to both the neon lamp supporting plates 11a and 12a. Thus, these plates and the anodes of neon lamps 47 to 56, inclusive, connected thereto are positive with respect to ground.

Line 117 which is connected to the programming switches shown in FIG. 6 is connected to the negative side of capacitor 119 through resistor 118. Line 120 which is connected to the programming switches shown in FIG. 6a is connected to the positive side of the current supply source 143, through resistor 121, transistor 122 and resistor 144. Thus, line 117 supplies a negative charge through the activated programming switches and resistors 133 to 142 associated therewith, to the capacitors 57 to 66 which are connected to these activated switches and resistors. The activated switches connected to line 120 supply positive charges with respect to ground to the capacitors 57 to 66 which are connected to these activated switches. Thus, certain of the capacitors will receive a negative charge with respect to ground while other selected capacitors will receive a positive charge with respect to ground during the programming of this device.

In explaining the operation of this device it is assumed that one of the programming holes punched in the card 10a is aligned with the switch designated by A. Therefore when the program bar 33 is depressed and the switch at this position is closed a positive charge is supplied to capacitor 61 through resistor 137 and line 71 thereby charging this capacitor positively in relation to ground. Capacitor 61 is associated with switches 21 and 22 and these switches correspond to the choices of answers to the question on card 10a related thereto. If switch 22 is closed a voltage drop is produced across resistor 92 from the charge of the capacitor 61 and the top terminal of the resistor 92 will be positive. This voltage drop adds to the voltage of the current supply source 143 and lamp 51 is fired thereby indicating that switch 22 corresponded to the correct answer to this question. On the other hand if switch 21 were closed instead of switch 22 the voltage drop across resistor 91 would have a positive polarity at the bottom terminal of this resistor. Thus, this voltage drop would be in opposition to the current supply source 143 so that the lamp 51 would not have been fired. However, capacitor 61 would be discharged through resistor 91 and even if switch 22 were closed thereafter lamp 51 would not be fired. The operation of the other capacitor and lamp circuits shown in FIGS. 6 and 6a is similar to that described above in connection with capacitor 61 and lamp 51.

The operation of the circuits shown in FIGS. 7 and 7a is somewhat different from that of the circuit shown in FIGS. 6 and 6a inasmuch as the lamp plates 11a and 12a are in the case of FIGS. 7 and 7a connected to the negative terminal of the current supply source 143 by line 150. This circuit results in somewhat more stable operation of the lamps. It is again assumed that one of the perforations provided to the question card 10a is in alignment with switch A so that when the program bar 33 is depressed capacitor 61 is charged through resistor 137 and line 186. However in this case capacitor 61 is provided with a negative charge with respect to the ground inasmuch as switch A is connected to line 117a which is connected through resistor 118 to the negative side of capacitor 119. Thus, if switch 22a is closed by the operator to indicate his selection of the answer to the question aligned with this switch, then the voltage drop across resistor 92 resulting from discharging capacitor 61 through the right hand contacts of switch 22a, places a negative polarity at the top of this resistor. This voltage drop is added to the voltage of current supply source 143 which is connected thereto by resistor 161, line 151, switch 149, and transistor 122. The voltage of source 143 and the drop across resistor 92 is sufficient to fire the lamp 51. On the other hand if switch 21a had been closed instead of switch 22a then the lower terminal of resistor 91 would have assumed the negative polarity and the voltage drop across this resistor would have been in opposition to the voltage of the source 143 so that insufficient voltage would have been provided across lamp 51 to fire it.

The circuits shown in FIGS. 7 and 7a are provided with switches 13a to 32a with two sets of contacts each. The purpose of this is to provide a circuit which may be readily converted from a choice 2 to a choice 4. In a choice 2 circuit each question provided to the card 10a has only a choice of two answers, one of which is correct. On the other hand in a choice 4 circuit each question has a choice of four answers, one of which is correct.

This circuit may be converted into a choice 4 circuit by closing the switch 177, which is attached to the cabinet 10 of this device under the cabinet structure 34 so that it may be closed when the card 10a is inserted on the top of the cabinet with the upper part of this card under this cabinet structure. Switch 177 may be a microswitch which is closed by the card if no perforation is provided to the card at this position. If it is desired to leave switch 177 open, then the card 10a is provided with a perforation at this point so that the switch is not closed. Switch 177 is connected between lines 150 and 188, and when it is closed these lines are connected together through a suitable resistor. Resistors 189, 190, 191 and 192 are connected in series to line 188 and to selected contacts of the left hand portions of switches 13a to 22a. Likewise, resistors 193, 194, 195 and 196 shown in FIG. 7 are connected in series to line 188 and they are also connected to selected contacts of the right hand bank of switches 23a to 32a. Thus when switch 177 is closed it functions to associate the circuits of capacitor 61 and capacitor 66 to provide the four choice answers through the use of switches 21a, 22a, 31a and 32a. The circuits of capacitors 60–65, 59–64, 58–63 and 57–62 are also paired when this device is connected in the choice 4 mode. If it is assumed that capacitor 61 was charged through switch A, resistor 137 and line 186 to provide a negative charge thereto with respect to ground. Then if switch 22a is closed by the operator the charge of capacitor 61 is placed across resistor 92 and lamp 51 is fired as previously described. The left hand side of switch 22a was also closed at this time and if it had a charge it would have been discharged through resistors 189, 190, 191 and 192. On the other hand if switch 32a had been closed then no signal would have been supplied to lamp 56 since capacitor 66 was not charged. At the same time, however, the right hand section of switch 32 would have been closed and capacitor 61 discharged through line 186 and resistors 196, 195, 194, and 193 to line 188 and switch 177 to ground. Consequently, thereafter no further choice with switches 21a, 22a or 31a would be possible.

In FIG. 9 there is illustrated a wiring diagram showing additions that may be made to the circuit shown in FIGS. 8 and 8a to change this circuit to a multiple choice 4 from a choice 2 circuit. This addition requires that each of the switches 13b to 32b be provided with an additional bank of contacts and switches such as indicated at 13c, 14c, 23c and 24c in the case of switches 13b, 14b, 23b and 24b, respectively, and that the corresponding switches be mechanically coupled so that they are operated together in pairs 13b–13c, 14b–14c, 23b–23c, and 24b–24c. The lower contacts of switches 13c and 14c are connected by line 13d to the anode of diode 13e and the lower contacts of switches 23c and 24c are connected by line 23d to the anode of diode 23e. The cathodes of diodes 13e and 23e are connected through a resistor to one side of the cancelling switch 177a and the other side of this switch is connected to line 151. The middle contacts of switches 13c and 14c are connected by line 14d to the upper terminal of resistor 94, and the middle contacts of switches 23c and 24c are connected by line 24d to the lower terminal of resistor 83.

Thus the circuits of capacitor 57 and lamp 47 are interconnected with the circuits of capacitor 62 and lamp 52 so that these circuits may be used in a multiple choice 4 device when switch 177a is closed. To change the circuits of FIGS. 8 and 8a to a choice 4 device additional interconnecting circuits may be provided therein as follows: between capacitor 58, lamp 48 and capacitor 63, lamp 53, between capacitor 59, lamp 49 and capacitor 64, lamp 54, between capacitor 60, lamp 50 and capacitor 65, lamp 55 and between capacitor 61, lamp 51 and capacitor 66, lamp 56. Each of these interconnecting circuits is provided with diodes corresponding to diodes 13e and 23e and the cathodes of all of the diodes of these interconnecting circuits are connected together to switch 177a.

When the circuits of FIGS. 8 and 8a are provided with the interconnecting circuits as described above and the switch 177a is closed the opposing capacitor and lamp circuits function in a multiple choice 4 arrangement, and in such an arrangement the card 10a is provided with four answer choices for each question, out of which of course only one answer is correct. Thus, in the programming of such a multiple choice 4 arrangement in which opposing capacitors are interconnected as shown in FIG. 9, only one of these interconnected capacitors is provided with a charge during the programming of the device.

This is accomplished by providing additional programming perforations to the top of the card 10a when the answers on the card are of the choice 4 type. If the circuits shown in FIGS. 8 and 8a are modified as described so that they may be used with choice 4 answers these programming perforations may be arranged as will now be described. It is assumed that capacitors 57, 59, 61, 63, and 65 are to be provided with charges by providing perforations opposite switches J, F, B, S, and M, respectively. Thus, capacitor 57, 61 and 65 will receive positive charges with respect to ground and capacitors 59 and 63 will receive negative charges with respect to ground. Capacitors 58, 60, 62, 64 and 66 are not to be charged and therefore the question card 10a must be perforated opposite switch pairs GH, CD, TU, PO, and KL, respectively. Perforating the card opposite switches G and H connects both the positive line 120a and negative line 117a to capacitor 58 with the result that no charge is supplied thereto. The same result is obtained with respect to capacitors 60, 62, 64 and 66 by providing perforations opposite switch pairs CD, TU, PO, and KL, respectively.

If, during the programming of this device it is assumed that capacitor 57 is provided with a positive charge through switch J and line 67b and switches 14b–14c correspond to the correct answer, then closing switch causes the charge of capacitor 57 to be placed across resistor 84 and resistor 198. The voltage drop across resistor 84 and the bias obtained from current supply source 143 are sufficient to fire the neon lamp 47 to indicate that the correct answer has been selected to the question by the operator. On the other hand, if the operator had closed switches 24b–24c instead of switches 14b–14c thereby closing the circuits between the middle and lower contacts of these switches then lines 23d and 24d would have been connected together through 24c. As a result the anode of diode 23e would have been connected to the bottom terminal of resistor 83. At the same time the switch 24b which is mechanically coupled to the switch 24c would also have been moved to make contact between its center contact and its lower contact. Since capacitor 62 was not charged then of course neon lamp 52 would not have been fired, and the operator of this device would then have realized that the selecting switches 24b–24c was not the correct selection. However, switches 24b and 24c would be latched in their depressed position and if the operator tried to obtain the correct answer by closing switch 14b he would simply make it possible for capacitor 57 to be discharged through diode 23e which is connected across resistors 83 and 84 and lamp 47 would not be fired even though switches 14b–14c correspond to the right answer.

While I have shown a preferred embodiment of my invention, it will be understood that the invention is capable of variation and modification from the form shown so that the scope thereof should be limited only by the scope of the claims appended hereto.

What I claim is:

1. In an electrical education and amusement device, the combination of a housing, a card having a plurality of questions together with a choice of answers arranged thereon in a predetermined array, said card being adapted to be positioned on said housing in a predetermined manner, a plurality of electrical discharge devices connected to an electric circuit and positioned in said housing, said electric circuit including metal plate means to which one side of each of said electric discharge devices is connected, a plurality of electrical storage devices positioned in said housing, each of said electrical discharge device circuits having a storage device of said plurality of storage devices associated therewith, said card having a predetermined programming pattern related to said choice of answers, programming means comprising a plurality of electric switches supported by said housing, an enclosure for said electric switches, said enclosure including a member for simultaneously closing selected ones of said switches determined by said programming pattern, each of said electric switches having a pair of contacts which are normally open and one of the contacts of each of said pair of contacts being supported above the other so that said card is adapted to be inserted therebetween with said predetermined programming pattern aligned with selected switches, current supply means, an on-off switch positioned under said enclosure, means connecting said on-off switch to said current supply means to control the current to said programming switches, said on-off switch being closed when the portion of said card having said programming pattern is inserted in said enclosure, said selected switches being closed simultaneously by pressing on said member after said card is inserted between the contacts of said switches for simultaneously charging said storage devices from said current supply means in accordance with said predetermined pattern, and means supplying electric charges of said storage devices to said circuits of said electric discharge devices to fire the electric discharge devices when the charges of said storage devices are supplied to said circuits in accordance with a pattern related to said predetermined pattern.

2. In an electrical education and amusement device, the combination as set forth in claim 1, further characterized in that said current supply means includes a capacitor and a current source charging said capacitor, and said programming means including means charging selected ones of said storage devices with one polarity directly from said current source and selected others of said storage devices with another polarity from said capacitor with respect to said metal plate means to which said electric discharge devices are connected .

3. In an electrical education and amusement device, the combination as set forth in claim 2, further characterized in that said programming switches are divided into two groups, means connecting one side of the switches of one of said groups together to said capacitor and means connecting one side of the switches of the other of said groups together to said current source, and means connecting the other sides of said switches to selected ones of said storage devices.

4. In an electrical education and amusement device, the combination as set forth in claim 1, further comprising impedances connected to each of said programming switches, said impedances being connected between said switches and said storage devices to equalize current distribution during charging of storage devices simultaneously during programming.

5. In an electrical education and amusement device, the combination as set forth in claim 1, further comprising counting means, for counting the number of said questions answered correctly, means connecting said counting means to said electric discharge devices so that firing said discharge devices energizes said counting means.

6. In an electrical education and amusement device the combination of a housing, a card having examination questions reproduced thereon together with a multiple choice of answers to said questions, only one of which is a correct answer to each question, said housing supporting said card, an electronic memory having a plurality of sections with a section thereof associated with each of the examination questions when said card is placed in a predetermined position on said housing, current supply means, means programming said electronic memory comprising a plurality of electric switches, an on-off switch, means connecting said on-off switch to said current supply means to control the current to said programming means, each of said switches having a pair of contacts which are normally open, a panel member extending over said switches, said card being adapted to be inserted partially under said panel member and between said normally open contacts, said card closing said on-off switch automatically when it is inserted into said plurality of switches, said housing supporting a manually operable programming member in normally retracted position, said card having means correlated with answers to said questions selecting the said switches which are to be closed by said programming member in the programming of said memory, said programming member being momentarily actuated manually for closing said selected switches after said card is inserted into said switches, an auxiliary memory associated with said electronic memory, a plurality of means manually operated by the student, one of said manually operated means being associated with each of the multiple choice answers on said card, said manually operated means connecting said electronic memory for activating said auxiliary memory if the correct answer is selected by the student for a predetermined question.

7. In an electrical education and amusement device, the combination as set forth in claim 6, further comprising means connecting one side of said programming switches in one of said switch groups together, means connecting one side of the switches in the other of said groups of said programming means together, an auxiliary switch mechanically coupled to said programming member, said programming means comprises switches divided into two groups, said current supply means including a current source and a capacitor connected thereto by said auxiliary switch, said auxiliary switch connecting said capacitor to said current source to charge said capacitor when said programming member is in retracted position, means connecting said capacitor to said switches of said one group and means connecting said current source to said switches of said other group so that selected ones of said storage devices are charged with one polarity from said capacitor and selected others of said storage devices are charged with another polarity from said current source.

8. In an electrical education and amusement device, the combination as set forth in claim 6, further characterised in that said auxiliary memory is connected to a counting device, said auxiliary memory supplying a signal to said counting device each time a question is answered correctly.

9. In an electrical education and amusement device, the combination as set forth in claim 6, further characterised in that said auxiliary memory comprises a plurality of electric discharge devices, said electric discharge devices being connected to be fired each time a question is answered correctly, a counting device, means supplying a signal to said counting device from said electric discharge devices each time a question is answered correctly.

10. In an electrical education and amusement device, the combination as set forth in claim 9, further characterised in that said signal supplying means comprises a common line connected to said counting means, said common line being connected to each of said electric discharge devices by a diode.

11. In an electrical education and amusement device the combination of a housing, a card having examination questions reproduced thereon together with a multiple choice of answers to said questions, said questions having either a choice of two answers or a choice of answers greater than two, only one of which is a correct answer to each question, said housing supporting said card, an electronic memory having a plurality of electrical storage devices, means for conditioning said memory to process answers to questions with either a choice of two answers or a choice of answers greater than two, each of said electrical discharge device circuits having auxiliary switch means and a storage device of said plurality of storage devices associated therewith when questions with a choice of two answers are to be processed, said conditioning means comprising a common line connected to said circuits, a plurality of diodes connected one to each of said circuits, and means connecting all of said diodes to said common line when questions with a choice of greater than two answers are to be procesed, current supply means, programming means charging said storage devices from said current supply means in accordance with a predetermined pattern, said programming means comprising two groups, means connecting said two groups to said current supply means so that electric charges of positive polarity are supplied to said storage devices through one of said groups and electric charges of negative polarity are supplied to said storage devices through the other of said groups, said programming means also including means activating selected parts of said two groups simultaneously to supply the corresponding electric charges to said storage devices, and means applying electric charges of said storage devices to said circuits of said electric discharge devices associated therewith to fire the electric discharge devices when the charges of said storage devices are applied to said circuits in accordance with a pattern related to said predetermined pattern.

12. In an electrical education and amusement device, the combination of a housing, a card having a plurality of questions together with a choice of answers arranged thereon in a predetermined array, said card being adapted to be positioned on said housing in a predetermined manner, a plurality of electric discharge devices, means supporting said electric discharge devices in said housing, means connecting said devices to an electric circuit, a plurality of electrical storage devices positioned in said housing, each of said electric discharge device circuits having a storage device of said plurality of storage devices associated therewith, said card having a predetermined programming pattern related to said choice of answers, programming means comprising a plurality of programming switches supported by said housing, said electric switches being divided into two groups, current supply means comprising a source of current and a capacitor, means including a charge control switch connecting one side of said capacitor to one side of said current source for charging said capacitor, connections between the other side of said capacitor and one of said groups and connections between said source and other of said groups, said programming means including means for shifting said charge control switch to connect said one side of said capacitor to the other side of said current source and for actuating said programming switches after said card is inserted between the contacts of said switches for charging selected ones of said storage devices from said current source and for charging other selected ones of said storage devices from said capacitor so that said first mentioned selected ones of said storage devices are charged with an opposite polarity from said selected other storage devices, and means supplying electric charges of said storage devices to said circuits of said electric discharge devices to fire the electric discharge devices.

13. In an electrical education and amusement device, the combination as set forth in claim 12, further characterized in that said means supporting said devices comprises metal plate means and said connecting means includes said metal plate means.

14. In an electrical education and amusement device, the combination as set forth in claim 12, further comprising an additional diode connecting said other side of said capacitor to a side of said current supply which is connected to a ground line, said one side of said capacitor being connected to said charge control switch whereby said capacitor is charged from said current source, said charge control switch connecting said one side of said capacitor to said ground line when said programming switches are actuated.

References Cited

UNITED STATES PATENTS

| | | | |
|---|---|---|---|
| 2,720,038 | 10/1955 | Clark | 35—9 R |
| 2,838,847 | 6/1958 | Zalkind | 35—9 R |
| 3,327,405 | 6/1967 | Ingeneri | 35—9 R |

WILLIAM H. GRIEB, Primary Examiner

U.S. Cl. X.R.

35—9 R